United States Patent Office 3,475,480
Patented Oct. 28, 1969

3,475,480
SYNTHESIS OF AROMATIC NITRILES
BY NITRILIZING HALOGENATED
INTERMEDIATES
Mohammad Ali Habibi, Kansas City, Kans., assignor to Thompson-Hayward Chemical Company, Kansas City, Kans., a corporation of Delaware
No Drawing. Filed May 17, 1966, Ser. No. 550,611
Int. Cl. C07c 121/06, 121/64
U.S. Cl. 260—465                 4 Claims

ABSTRACT OF THE DISCLOSURE

A method of preparing compounds of the formula

Y—CN wherein Y is an aryl or substituted aryl moiety, by nitrilizing a compound of the formula Y—CHZ$_2$, wherein Z is halo and Y is as defined above, by treatment with a metallic azide nitrilizing agent in the presence of an excess amount of a strong mineral acid. The final products of this process are useful as dyes, pesticides or herbicides.

---

This invention relates to and has for its object, the provisions of useful chemical compounds and new processes for the preparation thereof. More particularly, this invention relates to aromatic nitrile compounds and to novel methods of preparing them.

Heretofore in the preparation of certain useful aromatic nitrile compounds, it has been necessary to employ an expensive, time consuming and comparatively inefficient procedure of production. To commercially produce the aromatic nitrile compounds of this invention required the construction of large, elaborate facilities and employment of a great amount of solvents and other non-reactive materials, which had to be recovered or otherwise disposed of prior to marketing the aromatic nitrile product produced thereby.

It has now been discovered that aromatic nitrile compounds may be efficiently and easily prepared without encountering the disadvantage heretofore existing in the preparation thereof. It has now been found that the practice of the novel process of the instant invention allows the efficient and economical production of the desirable and useful nitrile compounds of this invention.

The desirable and useful aromatic nitrile compounds of this invention which may be prepared according to the novel process of this invention, include such compounds as those of the formulae:

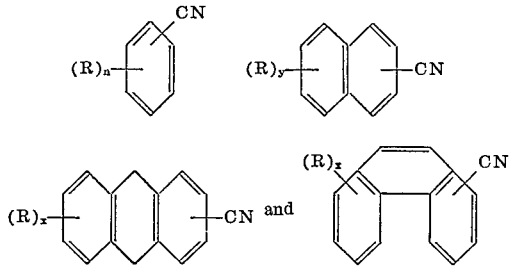

wherein $n$ may be a number from zero to five; $y$ may be a number from zero to seven; $x$ may be a number from zero to nine; and each R may be selected from the group consisting of hydrogen, halogen (e.g. chloro, bromo, fluoro or iodo), alkyl (e.g. ethyl, propyl), alkoxy (e.g. methoxy or ethoxy); nitro, aryl (e.g. phenyl or naphthyl) and substituted aryl (e.g. halophenyl or tolyl). Most preferably R may be hydrogen, halogen or alkyl.

Among the final products which may be prepared according to this invention may be included such compounds, as benzonitrile, halobenzonitrile (e.g. 6-chlorobenzonitrile), dihalobenzonitrile (e.g. 2,6-dichlorobenzonitrile), alkylbenzonitrile (e.g. 2-methylbenzonitrile), dialkylbenzonitrile (e.g. 2,3-dimethylbenzonitrile), nitrobenzonitrile, alkoxybenzonitrile (e.g. methoxy benzonitrile), arylbenzonitrile (e.g. phenylbenzonitrile), napthonitrile, halonaphtholonitrile (e.g. chloronaphthonitrile), dihalonaphthonitrile (e.g. dichloronaphthonitrile), alkylnaphthonitrile, alkoxynaphthonitrile, arylnaphthonitrile, anthronitriles, haloanthronitriles, and phenanthronitriles.

The final products of this invention are useful compounds which may be employed for such purposes as dyes, pesticides, herbicides and other purposes as are known to the skilled worker. For these purposes the final products of this invention may be employed in the manner known to the art. For example, if a final product of this invention is employed as a pesticide or herbicide, it may be incorporated into various compositions for use for such purposes. Thus, one final product of this invention, such as 2,6-dichlorobenzonitrile, a known herbicidal compound, may be incorporated into such compositions as spreadable dusts, powders or sprays as is known to the art for employment for such purposes.

The final products of this invention are prepared in accordance with the process of this invention, which comprises a number of steps beginning with compounds of the following formulae as starting material;

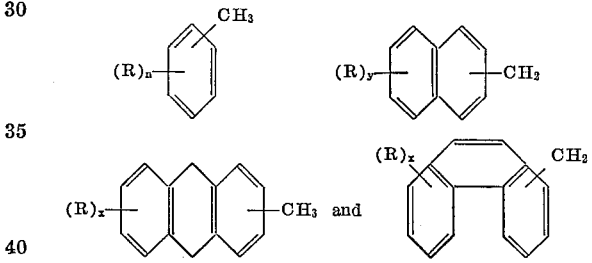

wherein $n$, $x$, $y$, and R have the same meaning as hereinbefore set forth.

In the first step of the process of this invention the starting material may be halogenated as by treatment with a halogenating agent, for example, chlorine or bromine with ultra violet light to yield intermediate compounds of the formulae:

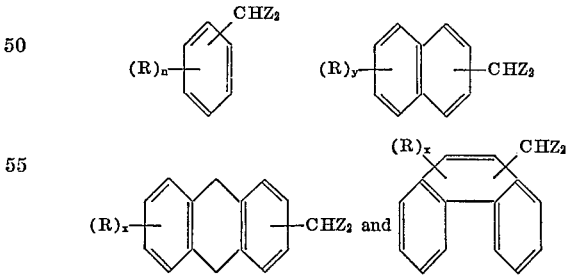

wherein Z is halogen and $x$, $y$, $n$, and R are as defined hereinabove. Many of these halogenated intermediates are known compounds and may be further directly employed in the practice of this invention without the necessity of performing this halogenating procedure in the practice of this invention.

These halogenated intermediates are then nitrilized as by treatment with a nitrilizing agent, for example, a metallic azide, such as an alkali metal azide, e.g., sodium azide, or potassium azide, or an alkaline earth metal azide, e.g., calcium azide and other like metallic azides, in the presence of an excess amount of a strong mineral acid, to yield the desired aromatic nitrile final products of this invention. The strong mineral acid which may be employed in the practice of this invention may be any one known to the art and may include such acids as concentrated sulfuric acid, phosphoric acid and other like mineral acids.

It has been found that in the practice of this invention, an excess amount of the strong mineral acid must be employed to obtain the desired aromatic nitrile final products. By an excess amount of strong mineral acid, it is meant that an amount of acid at least in excess of the mole equivalent of the reactants must be employed.

The invention may be illustrated by the following examples.

EXAMPLE 1

2,6-dichlorobenzonitrile

Nine grams of 2,6-dichlorobenzal chloride is added to 100 ml. of conc. (96%) sulfuric acid in a 500 ml. three-neck flask having a stirrer and addition funnel, and heated, with vigorous stirring to 50° C. The reaction mixture is slowly cooled to room temperature for a period of one hour. Two grams of sodium azide dissolved in ten ml. of water is then added dropwise over a period of fifteen minutes with vigorous stirring. After one hour, the reaction mixture is poured over 400 grams of ice and allowed to stand for thirty minutes. Filtration, water washing and air drying yields 3.85 grams of a fine white powder, M.P. 134–140° C. Recrystallization from ethanol yields white needles of 2,6-dichlorobenzonitrile having a melting point of 145.4–146.4° C.

Similarly, following the procedure of Example 1, but substituting equivalent amounts of potassium azide or calcium azide for the sodium azide, like results are obtained.

Similarly, following the procedure of Example 1, but substituting an equivalent amount of phosphoric acid for the sulfuric acid, like results are obtained.

EXAMPLE 2

Following the procedure of Example 1, but substituting an equivalent amount of 2-methylbenzal chloride, phenyl benzal chloride, benzal bromide, naphthal chloride, and chloronaphthal chloride for 2,6-dichlorobenzal chloride, there is obtained 2-methyl benzonitrile, phenylbenzonitrile, benzonitrile, naphthonitrile and chloronaphthonitrile respectively.

What is claimed is:

1. A method of preparing compounds of the formulae

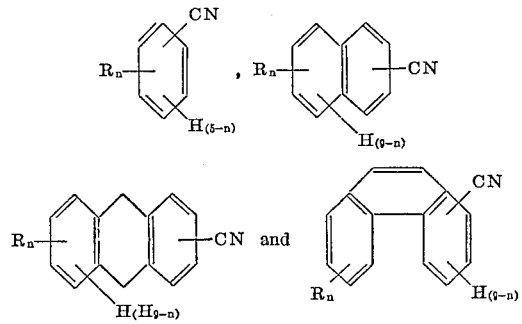

wherein each R is selected from the group consisting of halogen, lower alkyl, lower alkoxy, phenyl and nitro; and $n$ is a positive integer from 0 to 2; which consists of directly nitrilizing a starting material selected from the group consisting of compounds of the formulae:

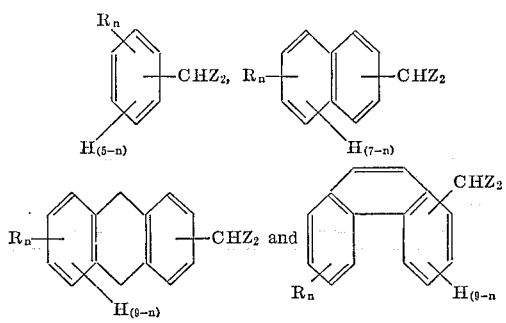

wherein R and $n$ are as defined hereinbefore; and Z is selected from the group consisting of bromo and chloro; by treating said starting material with a nitrilizing agent selected from the group consisting of alkali metal azides and alkaline earth metal azides, in the presence of a strong mineral acid, said mineral acid being present in an amount in excess of the mole, equivalent of the reactants set forth hereinbefore.

2. The method of claim 1, wherein the starting material is 2,6-dichlorobenzal chloride, and the nitrilizing agent is sodium azide.

3. The method of claim 1, wherein the acid is sulfuric acid.

4. The method of claim 1, wherein the nitrilizing agent is an alkali metal azide.

References Cited

OTHER REFERENCES

Hall et al.: Journal of the American Chemical Society, volume 89, pp. 5856–5861.

Wagner et al.: Synthetic Organic Chemistry, p. 285, 1963.

Houben-Weyl: Methoden Der Organischen Chemie, Saverstoffverbindujen III, p. 329, 1952.

CHARLES B. PARKER, Primary Examiner

S. T. LAWRENCE III, Assistant Examiner

U.S. Cl. X.R.

71—105; 204—158; 260—612, 613, 645, 646, 649, 650, 694, 999; 424—304